United States Patent
Yoshida

(10) Patent No.: US 10,852,684 B2
(45) Date of Patent: Dec. 1, 2020

(54) DRIVE TRANSMISSION APPARATUS AND IMAGE FORMING APPARATUS

(71) Applicant: Canon Kabushiki Kaisha, Tokyo (JP)

(72) Inventor: Atsushi Yoshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 15/465,693

(22) Filed: Mar. 22, 2017

(65) Prior Publication Data
US 2017/0293248 A1    Oct. 12, 2017

(30) Foreign Application Priority Data
Apr. 6, 2016   (JP) .................... 2016-076286

(51) Int. Cl.
| | |
|---|---|
| G03G 15/00 | (2006.01) |
| F16D 3/04 | (2006.01) |
| F16D 1/10 | (2006.01) |
| G03G 15/23 | (2006.01) |
| G03G 21/16 | (2006.01) |
| F16D 11/14 | (2006.01) |
| F16D 11/00 | (2006.01) |

(52) U.S. Cl.
CPC ......... *G03G 15/6529* (2013.01); *F16D 1/101* (2013.01); *F16D 3/04* (2013.01); *G03G 15/23* (2013.01); *G03G 21/1647* (2013.01); *F16D 11/14* (2013.01); *F16D 2011/008* (2013.01); *G03G 2221/1657* (2013.01)

(58) Field of Classification Search
None
See application file for complete search history.

(56) References Cited

U.S. PATENT DOCUMENTS

| | | | | |
|---|---|---|---|---|
| 1,370,864 | A * | 3/1921 | Welffens | F16D 3/04 464/102 |
| 1,488,497 | A * | 4/1924 | Higgins | F16D 3/04 464/105 |
| 2,756,573 | A * | 7/1956 | Colby | F16D 3/04 464/104 |
| 5,583,630 | A | 12/1996 | Kimura et al. | |
| 2009/0169247 | A1* | 7/2009 | Hattori | G03G 21/186 399/111 |

(Continued)

FOREIGN PATENT DOCUMENTS

| | | |
|---|---|---|
| JP | H06-332285 A | 12/1994 |
| JP | 2013-214003 A | 10/2013 |

*Primary Examiner* — Jill E Culler
(74) *Attorney, Agent, or Firm* — Venable LLP

(57) ABSTRACT

A drive transmission apparatus includes an engage member that is rotatable in a radially displaced state with respect to a shaft member and an engaged member that is rotatable centering on an axis parallel with the shaft member. The engage member and the engaged member are engaged with and disengaged from each other by relatively moving along an axial direction. The drive transmission apparatus further includes a moving portion which can move the engage member in a direction in which a rotational axis of the engage member approaches an axis of the shaft member in a disengaged condition in which the engage member is disengaged from the engaged member. The moving portion thus regulates offset amount of the engage member in the disengaged condition, so that the engage member and the engaged member reliably engage with each other.

20 Claims, 8 Drawing Sheets

(56) References Cited

U.S. PATENT DOCUMENTS

| | | | |
|---|---|---|---|
| 2010/0272470 A1* | 10/2010 | Tomatsu | G03G 21/1623 399/167 |
| 2010/0303503 A1* | 12/2010 | Woo | G03G 21/186 399/167 |
| 2013/0084099 A1* | 4/2013 | Hashimoto | G03G 15/0194 399/110 |
| 2013/0272753 A1* | 10/2013 | Fukasawa | G03G 21/18 399/279 |
| 2017/0146950 A1* | 5/2017 | Moon | G03G 21/1647 |

* cited by examiner

DRIVE TRANSMISSION APPARATUS AND IMAGE FORMING APPARATUS

BACKGROUND OF THE INVENTION

Field of the Invention

The present invention relates to a drive transmission apparatus configured to transmit driving force of a driving source and to an image forming apparatus including the drive transmission apparatus.

Description of the Related Art

There is a drive transmission apparatus including an Oldham mechanism, which transmits driving force from a driving source while accommodating a misalignment of driving and driven shafts. An ordinary Oldham mechanism is provided with an intermediate member between the driving and driven shafts. The intermediate member is radially displaceable with respect to each of the driving and driven shafts and transmits rotation of the driving shaft to the driven shaft while making an orbital motion, in order to absorb the misalignment between the shafts.

Japanese Patent Laid-Open No. 06-332285 discloses a configuration in which a drive transmission apparatus including an Oldham mechanism is disposed between a driving motor provided in an apparatus body of an image forming apparatus and a developing apparatus actuated by driving force of the driving motor. This developing apparatus is a so-called rotational developing apparatus in which four developing units whose toner colors are different are supported by a rotational casing, and as the casing rotates, one developing unit among the four developing units is connected to the driving motor through a coupling member. This coupling member constitutes an Oldham mechanism, and is supported by a joint shaft connected to the driving motor while being displaceable with respect to the joint shaft and movable in an axial direction of the joint shaft. When the joint shaft moves in the axial direction, a convex portion provided at a front end of the coupling member fits into a concave portion of a coupling gear provided in each developing unit. Then, the coupling member is put into a condition in which the coupling member can transmit the driving force while absorbing variation of positions of the developing units.

Here, in the configuration of Japanese Patent Laid-Open No. 06-332285, a tapered face is formed around the convex portion so that the convex portion of the coupling member engages smoothly with the concave portion of the coupling gear. However, in a disengaged condition in which the coupling member is disengaged from the coupling gear, the coupling member may become radially displaced with respect to the joint shaft. Therefore, there is a possibility that an engagement failure occurs between the coupling member and the coupling gear when an offset amount between the coupling member and the coupling gear exceeds a certain range corresponding to the width of the tapered face due to the displacement of the coupling member in the disengaged condition.

SUMMARY OF THE INVENTION

The present disclosure provides a drive transmission apparatus capable of decreasing engagement failure in a configuration in which an engage member is engaged with an engaged member with a relative movement along an axial direction and which accommodates misalignment between shafts in an engaged condition. The present disclosure also provides an image forming apparatus including such drive transmission apparatus.

According to one aspect of the present invention, a drive transmission apparatus configured to transmit driving force includes a shaft member disposed on a first axis, an engage member supported by the shaft member and configured to rotate, an engaged member configured to rotate centering on a second axis in parallel with the first axis and to be engaged with and disengaged from the engage member by relatively moving with respect to the engage member along an axial direction of the first axis, an intermediate member interposed between the shaft member and the engage member and configured to permit the engage member to rotate centering on the second axis in an engaged condition in which the engage member is engaged with the engaged member, and a moving portion configured to move the engage member in a direction in which a rotational axis of the engage member approaches the first axis in a disengaged condition in which the engage member is disengaged from the engaged member.

According to another aspect of the present invention, a drive transmission apparatus, includes a shaft member disposed on a first axis, an engage member supported by the shaft member and configured to rotate, an engaged member configured to rotate centering on a second axis in parallel with the first axis and to be engaged with and disengaged from the engage member by relatively moving with respect to the engage member along an axial direction of the first axis, an intermediate member interposed between the shaft member and the engage member and configured to permit the engage member to rotate centering on the second axis in an engaged condition in which the engage member is engaged with the engaged member, and a moving portion configured to abut against and move the engage member in a direction in which a rotational axis of the engage member approaches the second axis in a case in which the engage member and the engaged member approach each other in a disengaged condition in which the engage member is disengaged from the engaged member.

Further features of the present invention will become apparent from the following description of exemplary embodiments with reference to the attached drawings.

DESCRIPTION OF THE EMBODIMENTS

Figure 1:
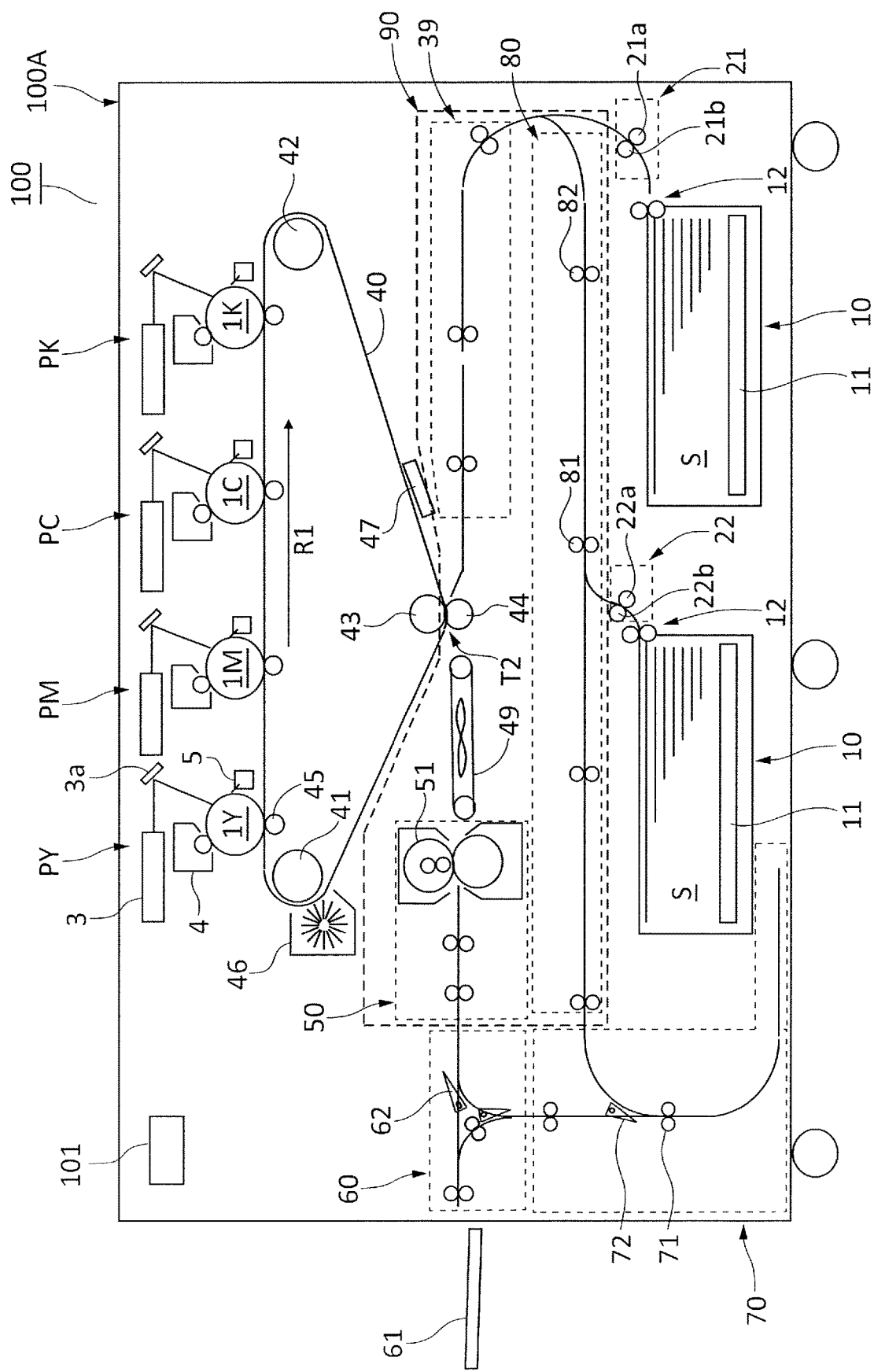
FIG. 1 is a schematic diagram illustrating a configuration of an image forming apparatus of the present disclosure.

A drive transmission apparatus of the present disclosure will be described below with reference to the drawings. The drive transmission apparatus can be used as a part of an image forming apparatus 100 whose schematic structure is illustrated in FIG. 1. It is noted that the drive transmission apparatus of the present disclosure is applicable not only to an image forming apparatus but also to any product, including industrial machines, fluid compressors, and automobile components, as a drive transmission apparatus transmitting driving force while accommodating misalignment between shafts.

First Embodiment

The image forming apparatus 100 of the present disclosure is an electrophotographic full-color laser beam printer. An apparatus body 100A of the image forming apparatus 100 includes a sheet feed cassette 10 storing a sheet S and image forming portions PY, PM, PC and PK configured to form an image on the sheet S fed from the sheet feed cassette 10. The sheet S, serving as a recording medium, is a sheet of paper such as a printing sheet, a plastic sheet such as an OHP film, or a sheet member such as cloth. The image forming portions PY, PM, PC and PK includes photosensitive drums 1Y, 1M, 1C and 1K composed of photoconductor for electrophotography and form yellow, magenta, cyan and black toner images, respectively. The respective color toner images are first transferred onto an intermediate transfer belt 40 and are then transferred onto the sheet S at a secondary transfer portion. Thereby, a full-color image is formed on the sheet S.

Image Forming Process

A configuration of the image forming portions PY, PM, PC and PK, and a toner image forming process (an image forming operation), now will be described. Because the configuration of the respective image forming portions are same except of the colors of toners used in development, the following description will be made using the image forming portion PY of yellow, as an example, and a description of the other image forming portions PM, PC and PK will be omitted.

Besides the photosensitive drum 1Y, the image forming portion PY includes an exposure unit 3, a developing unit 4, a drum cleaning unit 5 and others. The photosensitive drum 1Y is a drum-shaped photoconductor having a photosensitive layer on an outer circumference portion thereof and rotates along a rotation direction of the intermediate transfer belt 40 (an arrow R1 in FIG. 1). A surface of the photosensitive drum 1Y is electrified to a predetermined potential (dark part potential) by electrical discharge supplied by an electrification device such as an electrification roller. The exposure unit 3 draws an electrostatic latent image on the surface of the photosensitive drum 1Y by emitting a laser beam modulated in response to image information and scanning the photosensitive drum 1Y through an optical system including a reflection unit 3a. The developing unit 4 stores two-component developer including toner and carrier and develops the electrostatic latent image into a toner image by supplying the toner to the photosensitive drum 1Y.

The toner image formed on the photosensitive drum 1Y is transferred onto the intermediate transfer belt 40 at a nip portion, i.e., a primary transfer portion, between a primary transfer roller 45 and the intermediate transfer belt 40. The primary transfer roller 45 is in pressure contact with the photosensitive drum 1Y with the intermediate transfer belt 40 between them and moves the toner onto the intermediate transfer belt 40 by an electrostatic force caused by a predetermined bias voltage applied thereto. After the transfer, residual toner left on the photosensitive drum 1Y is removed by the drum cleaning unit 5.

The intermediate transfer belt 40 serving as an intermediate transfer member is stretched around a driving roller 41, a driven roller 42, a secondary transfer inner roller 43 and the primary transfer roller 45. The intermediate transfer belt 40 is rotationally driven in the predetermined direction (the arrow R1) by the driving roller 41. The image forming operation described above is carried out in parallel in the respective image forming portions PY, PM, PC and PK, and toner images of the four colors are superimposed and transferred onto the intermediate transfer belt 40 so as to overlap with each other. The toner image is moved while being borne on the intermediate transfer belt 40 and is conveyed to a nip portion, i.e., secondary transfer portion T2, between the secondary transfer inner roller 43 and a secondary transfer roller 44. A bias voltage whose polarity is reverse to that of electrified toner is applied to the secondary transfer roller 44 (a transfer device) and thereby the full-color toner image is collectively transferred onto the sheet S. It is noted that residual toner left on the intermediate transfer belt 40 after the transfer is removed by a belt cleaning unit 46.

The sheet S onto which the toner image has been transferred is conveyed to a fixing unit 50 by a pre-fixing conveyance unit 49. The fixing unit 50 includes a fixing roller pair 51 configured to nip and convey the sheet S and a heat source such as a halogen heater. The fixing unit 50 applies pressure and heat to the toner image borne on the sheet S. Toner particles thus melt and stick to the sheet S, so that a fixed image, which is fixed onto the sheet S, is obtained.

Sheet Conveyance Process

Next, a configuration and operations of a sheet conveyance system configured to feed the sheet S stored in the sheet feed cassette 10 and to discharge the sheet S onto which the image has been formed out of the apparatus body will be described. The sheet conveyance system roughly includes the sheet feed cassette 10, a drawing roller pair 22, a registration unit 39, the pre-fixing conveyance unit 49, the fixing unit 50, a branching unit 60, a reversing unit 70 and a duplex conveyance unit 80.

A plurality (two, in the case of FIG. 1) of sheet feed cassettes 10 is mounted drawably to the apparatus body 100A. Each of the sheet feed cassettes 10 includes a lift plate 11, which is able to lift with respect to a cassette body, and a sheet feed unit 12 configured to feed the sheet S stacked on the lift plate 11 to the apparatus body 100A. The sheet feed unit 12 conveys the sheet while separating the sheets one by one by a separation roller type separation mechanism, for example, and passes the sheet to drawing roller pairs 21 and 22.

The drawing roller pairs 21 and 22 include driving rollers 21a and 22a connected to a driving source and driven rollers 21b and 22b driven by the driving rollers 21a and 22a. The drawing roller pairs 21 and 22 convey and the sheet S received from the sheet feed unit 12 to a registration unit 39. It is noted that the sheet S conveyed by the drawing roller pair 22 upstream, i.e., on a left side in FIG. 1, of a sheet conveyance path is conveyed to the registration unit 39 through duplex path rollers 81 and 82 composing a duplex conveyance unit 80.

The registration unit 39 is configured to correct a skew of the sheet S by a shutter mechanism or the like and conveys the sheet S to the secondary transfer portion T2 at a timing adjusted to that of the toner image conveyed by the intermediate transfer belt 40. The sheet S onto which the toner image has been transferred at the secondary transfer portion T2 and then fixed by the fixing unit 50 is conveyed to a branching unit 60 including a switching member 62 configured to switch the conveyance path of the sheet S. When the process for forming the image onto the sheet S is completed, the sheet S is discharged to a discharge tray 61 disposed outside of the apparatus body 100A by passing through a discharge path. In a case when an image is to be formed on a back surface of the sheet S, the sheet S is passed to a reversing unit 70.

The reversing unit 70 includes a reversing roller 71 which is normally and reversely rotated and a guide member 72 configured to guide the sheet S conveyed by the reversing roller 71. The reversing unit 70 passes the sheet S to the duplex conveyance unit 80 in a condition in which the surface of the sheet S is reversed. The duplex conveyance unit 80 includes a guide member, defining a duplex conveyance path that extends in a horizontal direction, and the duplex path rollers 81 and 82 disposed along the duplex conveyance path. The reversing unit 70 conveys the sheet S received from the reversing unit 70 toward the registration unit 39. Thereby, the sheet S is conveyed again to the secondary transfer portion T2 and the fixing unit 50 to form the image on the back surface. The sheet S on both surfaces of which the images have been formed is discharged to the discharge tray 61 through the branching unit 60.

Here, a part of the conveyance system of the present embodiment is configured as a drawable portion 90 drawable out of the apparatus body 100A. The drawable portion 90 includes an upper conveyance path composed of the registration unit 39, the secondary transfer roller 44, the pre-fixing conveyance unit 49 and the fixing unit 50 and the duplex conveyance unit 80 disposed under the upper conveyance path. The apparatus body 100A also includes a conveyance sensor 47 disposed so as to monitor a conveyance condition of the sheet S, and in a case when a conveyance disorder occurs or a component needs to be replaced or inspected, a control portion 101 informs a user of that. In such a case, the user is thought to carry out a work with the drawable portion 90 drawn out of the apparatus body 100A and to complete the work by pushing and mounting the drawable portion 90 again into the apparatus body 100A.

Drive Transmission Portion

Next, a drive transmission apparatus 30 interposed between the driving source and a conveyance unit will be described. The description will be made with reference to the duplex conveyance unit 80 as an example of a conveyance unit. In this example, the drive transmission apparatus 30 is interposed between the driving source provided in the apparatus body 100A and the duplex conveyance unit 80. The duplex conveyance unit 80 is a part of the drawable portion 90 drawable out of the apparatus body 100A. In the present embodiment, the duplex path rollers 81 and 82 (the conveyance rollers) of the duplex conveyance unit 80 are configured to receive driving force from the driving source of the apparatus body 100A through the driving roller 22a of the drawing roller pair 22 (see FIG. 1).

Figure 2:
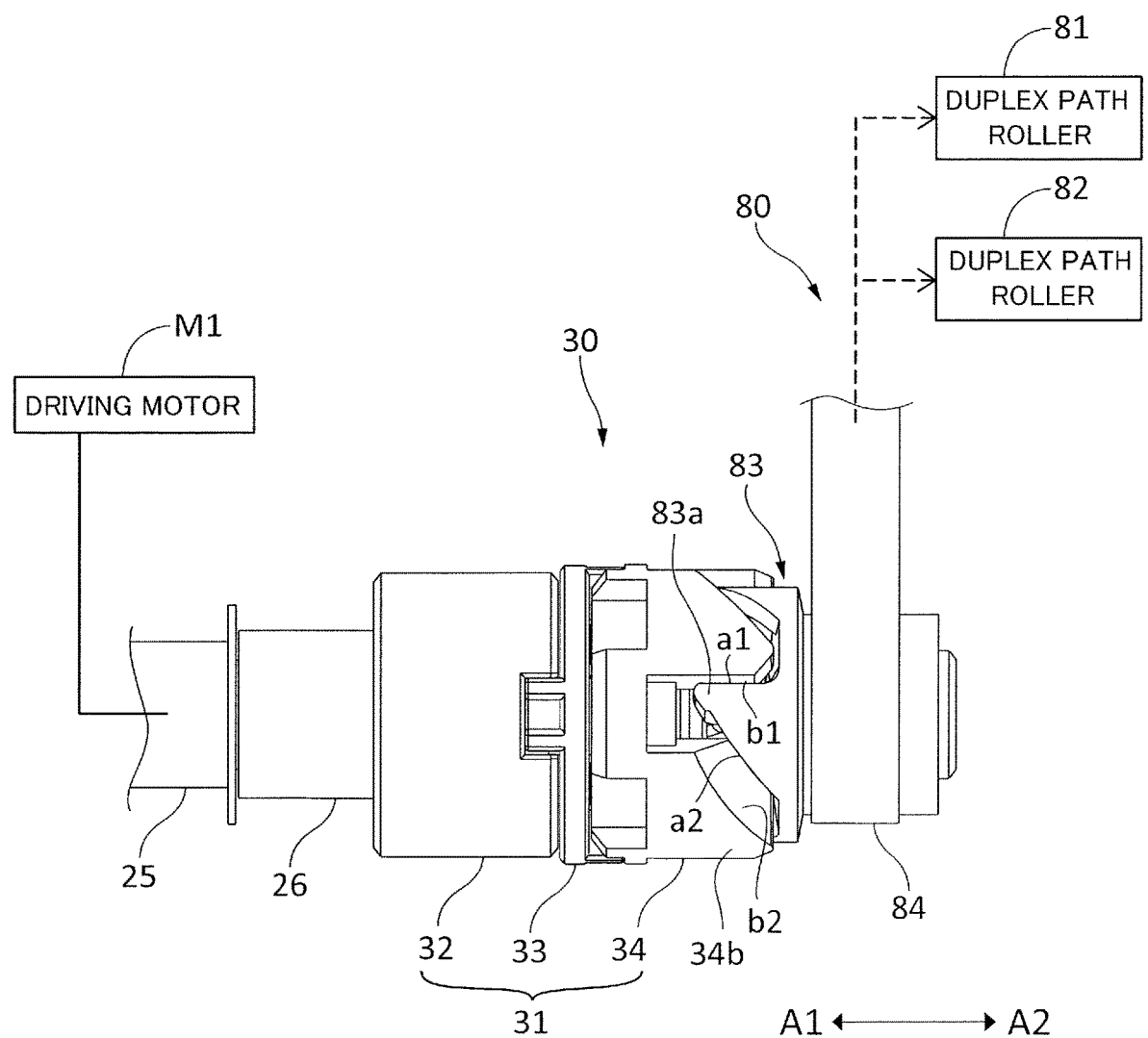
FIG. 2 is a front view of a drive transmission apparatus of a first embodiment.

As illustrated in FIG. 2, a driving motor M1, which serves as the driving source, rotates a driving shaft 25 supporting the driving roller 22a and outputs the driving force to the duplex conveyance unit 80 through the drive transmission apparatus 30. The drive transmission apparatus 30 includes a driving coupler 34 (a driving side coupling member), serving as an engage member, and a driven coupler 83 (a driven side coupling member), serving as an engaged member. The driving coupler 34 composes a part of an Oldham mechanism 31 which is configured to transmit driving force while accommodating misalignment between a rotational axis of the driving shaft 25 and a rotational axis of the driven coupler 83. Here, the rotational axis of the driving shaft 25 corresponds to a first axis (first axial line), and the rotational axis of the driven coupler 83 corresponds to a second axis (second axial line). A direction along the rotational axis of the driving shaft 25 will be referred to simply as an "axial direction" hereinafter.

In the drive transmission apparatus 30, the Oldham mechanism 31 is supported by the driving shaft 25, which serves as the shaft member, while the driven coupler 83 is supported by a frame body of the drawable portion 90. Accordingly, when the drawable portion 90 is drawn out, the driven coupler 83 is moved in one axial direction, i.e., in a draw-out direction A2 in this embodiment, and is put into a disengaged condition in which the driven coupler 83 is separated from the driving coupler 34. Still further, when the drawable portion 90 is inserted again into the apparatus body 100A, the driven coupler 83 moves in another axial direction in an insertion direction A1 in this embodiment, and is put into an engaged condition in which the driving coupler 34 is engaged with the driven coupler 83 and the driving force will be transmitted.

Figure 3A:
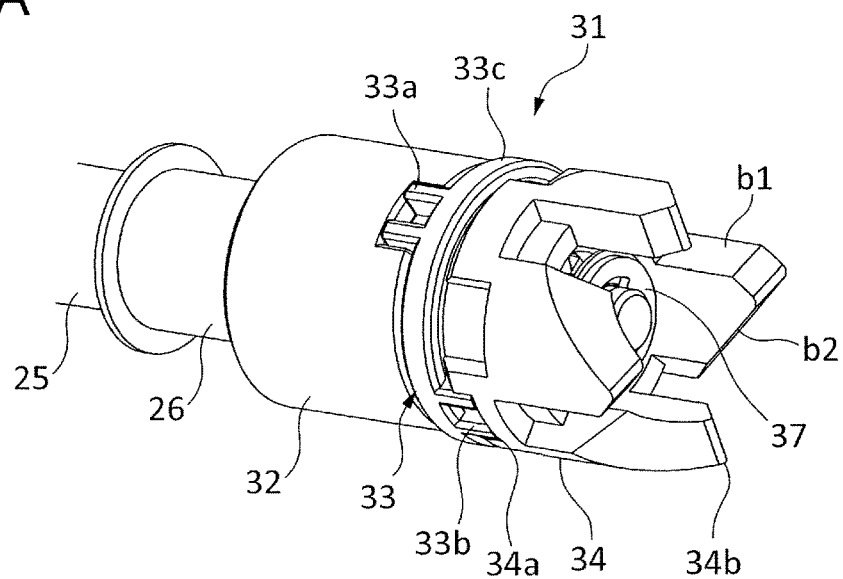
FIG. 3A is a perspective view illustrating the drive transmission apparatus of the first embodiment in a condition in which a driven coupler is disengaged.
Figure 3B:
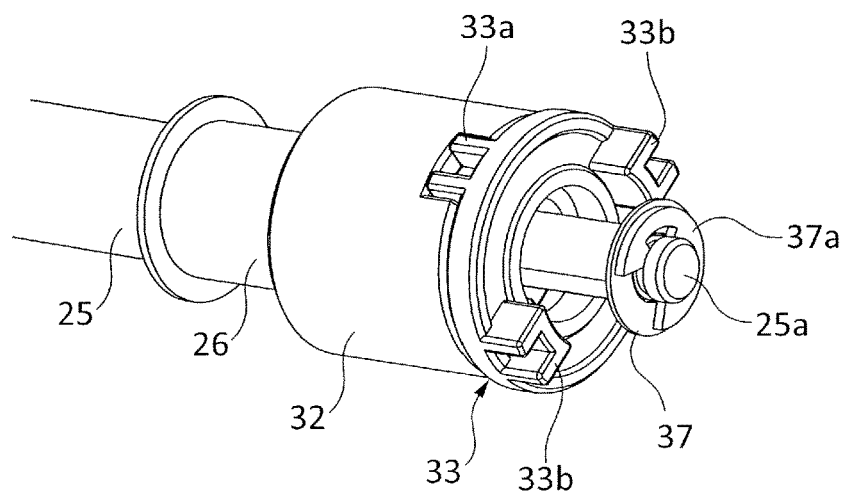
FIG. 3B is a perspective view illustrating the drive transmission apparatus from which a driving coupler is removed.
Figure 3C:
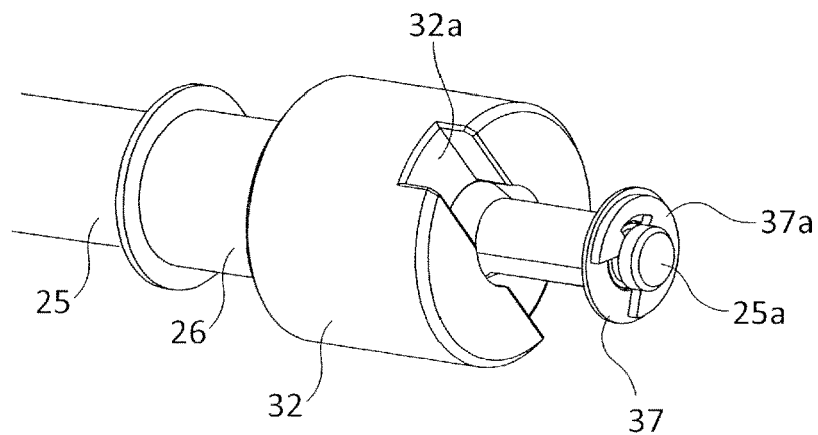
FIG. 3C is a perspective view illustrating the drive transmission apparatus from which an intermediate member is removed.

As illustrated in FIGS. 3A, 3B and 3C, the Oldham mechanism 31 includes a fixed member 32, an intermediate member 33, and the driving coupler 34. The fixed member 32 (see FIG. 3C) is a rotary member supported by the driving shaft 25 through spline engagement, key engagement, or other engagement mechanisms, so as to rotate in a body with the shaft, i.e., being unrotatable to the shaft, and to be movable along the axial direction. The driving coupler 34 (see FIG. 3A) is loosely fitted to the driving shaft 25 and is movable along the axial direction.

Here, a regulating ring 37, which serves as a ring-shaped rotational axis regulation member, is disposed at a front end 25a of the driving shaft 25 so as to project radially outward and to face an inner circumferential surface of the driving coupler 34. Accordingly, the driving coupler 34 is displaceable in the radial direction with respect to the driving shaft 25 within a range regulated by the regulating ring 37. Unless otherwise stated, 'a misalignment state' of the driving coupler 34 refers to a state in which a rotational axis, i.e., a rotation center, of the driving coupler 34 is displaced with respect to the rotational axis of the driving shaft 25, and 'an offset amount' of the driving coupler 34 refers to a displacement amount in a radial direction with respect to the rotation axis of the driving shaft hereinafter.

The intermediate member 33 (see FIG. 3B) interposed between the fixed member 32 and the driving coupler 34 includes a ringed, or disc shaped, body portion 33c and a first and second convex portions 33a and 33b. The first and second convex portions project from the ringed body portion 33c respectively toward one and another direction, i.e., a first and second direction opposite to each other, along the axial direction. The fixed member 32 is provided with a first groove 32a extending radially from the rotational axis of the driving shaft 25, and the first convex portion 33a of the intermediate member 33 slidably engages with the first groove 32a. Still further, the driving coupler 34 is provided with a second groove 34a radially extending from the rotational axis thereof, and the second convex portion 33b of the intermediate member 33 slidably engages with the second groove 34a. These first and second convex portions 33a and 33b are thus disposed on straight lines passing through the rotational axis of the intermediate member 33 and orthogonal to each other.

This arrangement makes it possible for the intermediate member 33 to rotate integrally with the fixed member 32 and the driving coupler 34 while radially displacing with respect to each of the fixed member 32 and the driving coupler 34 in a condition in which the driving coupler 34 is offset from the driving shaft 25. Here, an integral rotation refers to a rotating motion in which two rotators rotate with equal angular velocity.

Then, like the Oldham mechanism which is generally known, the Oldham mechanism 31 transmits rotation while accommodating the misalignment condition, in which the first and second axes are radially offset from each other, through the intermediate member 33 whose rotational axis draws a revolving orbit passing through the parallel first and second axes. In other words, the Oldham mechanism 31 and the driven coupler 83 serve as a shaft coupling that transmits rotation between the driving shaft 25 and the driven coupler 83 while accommodating relative displacement of the driving shaft 25 and the driven coupler 83 in a radial direction. This arrangement makes it possible to supply the driving force stably to the duplex conveyance unit 80 even if rotational axis positions of the driving shaft 25 and the driven coupler 83 deviate from each other in a case in which the drawable portion 90 is repeatedly inserted.

As illustrated in FIG. 2, the driven coupler 83 also functions as a pulley of a driving belt 84 driving the duplex path rollers 81 and 82 and is supported by a support shaft and supported by the frame body of the drawable portion 90. The driven coupler 83 is rotatable centering on an axial line, i.e., the second axis, in parallel with the driving shaft 25 at least in the condition in which the drawable portion 90 is inserted into the apparatus body 100A. When the driving coupler 34 is engaged with the driven coupler 83, the driven coupler 83 rotates by receiving the driving force from the driving motor M1, and the duplex path rollers 81 and 82 are rotationally driven through the driving belt 84.

The driving coupler 34 and the driven coupler 83 include engagement claws 34b and 83a which are engageable with each other and which serve as first and second engagement claws. The respective engagement claws 34b and 83a are pluralities (four each in the case of the illustrated example) of claw-like portions disposed along respective circumferential directions of the couplers 34 and 83. The respective engagement claws 34b and 83a include abutment surfaces a1 and b1 extending along the axial direction and guide surfaces a2 and b2 inclined with respect to the axial direction. In the condition in which the driving coupler 34 is engaged with the driven coupler 83, the abutment surfaces a1 and b1 engage with each other, so that rotational force of the driving coupler 34 is transmitted to the driven coupler 83. When the driven coupler 83, starting in the disengaged condition, moves in the insertion direction A1 and approaches to the driving coupler 34, the guide surfaces a2 and b2 function as guides to align rotational positions of the driving and driven couplers 34 and 83 by abutting with the guide surfaces of the opposite coupler.

The drive transmission apparatus 30 also includes a spring member 26 which serves as an urging member urging the driving coupler 34 along the axial direction and which is compressed between the driving shaft 25 and the fixed member 32 and externally fitted around the driving shaft 25. Because the driving coupler 34 is urged in an urging direction of the spring member 26, i.e., the draw-out direction A2, an impact force caused when the engagement claw 34b engages with the engagement claw 83a is buffered while stability of an abutment condition of the driving coupler 34 with the driven coupler 83 in the engaged condition is improved. It is noted that the spring member 26 composes a part of a moving portion that moves the driving coupler 34 as described later so as to regulate the offset amount of the driving coupler 34 in the disengaged condition.

Detailed Configuration of Oldham Mechanism

Figure 4:
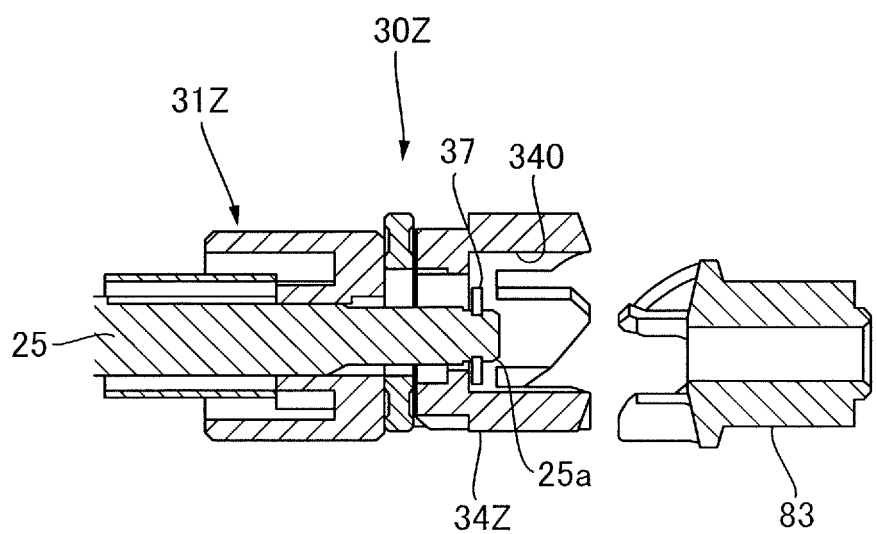
FIG. 4 is a section view illustrating a comparative configuration of the drive transmission apparatus.

Now, a circumstance that may occur in a conventional configuration will be described. A drive transmission apparatus 30Z for comparison whose section view is illustrated in FIG. 4 is an apparatus that transmits rotation of the driving shaft 25 to the driven coupler 83 by using an Oldham mechanism 31Z similarly to the present embodiment. As illustrated in FIG. 4, according to this configuration, the driving coupler 34 is configured to be displaceable with respect to the driving shaft 25 in the disengaged condition in which the driving coupler 34Z is disengaged from the driven coupler 83. More specifically, in a case of this configuration, an offset amount of the driving coupler 34Z permitted in the engaged condition, i.e., a difference between an inner diameter of an inner circumferential surface 340 and an outer diameter of the regulating ring 37, is equal with that of the driving coupler 34 permitted in the disengaged condition.

In such a configuration, the driving coupler 34Z being disengaged may be displaced relatively significantly with respect to the driving shaft 25. In such a case, there is a possibility that the engagement claw 34b does not engage adequately with the engagement claw 83a when the driving coupler 34Z and the driven coupler 83 approach each other. When the apparatus is to be configured compactly (see FIG. 2) by equalizing outer diameters of the engagement claws 34b and 83a approximately with outer diameters of the coupler pair 34 and 83 in particular, the offset amount of the driving coupler 34 in the disengaged condition may lead to engagement failure. In a case when such engagement failure occurs, there is a possibility that the drive transmission apparatus 30Z comes into trouble in transmitting driving force to the duplex conveyance unit 80, or the apparatus is damaged.

Figure 5A:
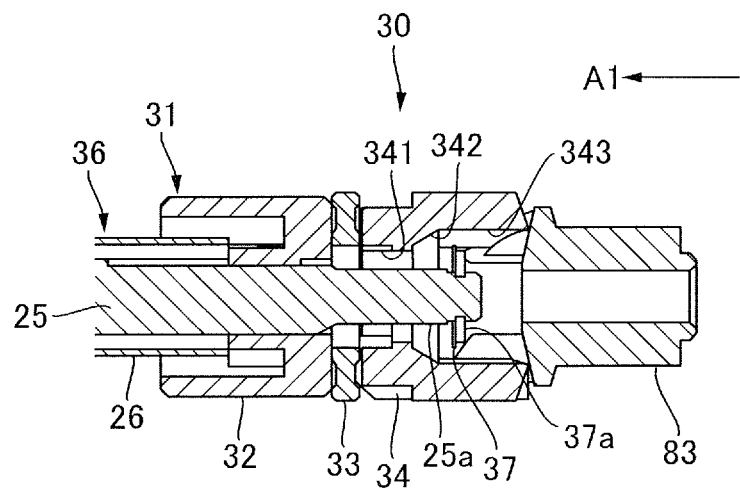
FIG. 5A is a section view illustrating the drive transmission apparatus of the first embodiment in an engaged condition.
Figure 5B:
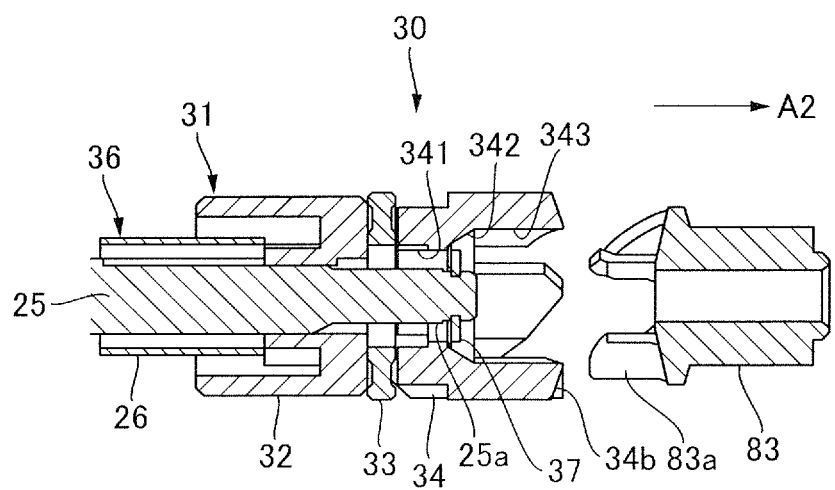
FIG. 5B is a section view illustrating the drive transmission apparatus in a disengaged condition.

Here, according to the present embodiment, there is provided an urging mechanism 36 serving as the moving portion moving the driving coupler 34 so as to regulate the offset amount, in the disengaged condition, of the driving coupler 34 with respect to the driving shaft. A configuration and operations of the urging mechanism 36 will be described below with reference to FIGS. 5A and 5B. Here, FIG. 5A is a section view illustrating the drive transmission apparatus 30 in the engaged condition in which the driving coupler 34 and the driven coupler 83 are engaged with each other, and FIG. 5B is a section view illustrating the drive transmission apparatus 30 in the disengaged condition.

The urging mechanism 36 is composed of a tapered face 342, the regulating ring 37, and the spring member 26. The tapered face 342, which is an example of an inclined face, composes a part of an inner circumferential surface of the driving coupler 34 and is formed between a large-diameter portion 343 whose inner diameter is larger than an outer diameter of the regulating ring 37 and a small-diameter portion 341 whose inner diameter is smaller than the large-diameter portion 343. The tapered face 342 is inclined with respect to the rotational axis of the driving shaft 25 and extends conically such that the inner diameter increases downstream of the draw-out direction A2. Still further, the tapered face 342 is formed such that an inner diameter, i.e., a smallest diameter, at an upstream end in the draw-out direction A2 is smaller than the outer diameter of the regulating ring 37. The regulating ring 37, which is an example of an abutment portion, is abuttable with the tapered face 342 and fixed to the driving shaft 25 by a snap ring 37a (see also FIG. 3B).

The spring member 26 serving as the urging member urges the driving coupler 34 in one direction (the draw-out direction A2) along the axial direction as described above. The tapered face 342 is thus pressed against the regulating ring 37 by urging force of the spring member 26 in the disengaged condition, and urging force in a radial direction in which the rotational axis of the driving coupler 34 approaches the rotational axis of the driving shaft 25 is generated. Still further, in the engaged condition, the driving coupler 34 is pushed in the insertion direction A1 while resisting against the urging force of the spring member 26 by the driven coupler 83, so that the regulating ring 37 separates from the tapered face 342 and faces the large-diameter portion 343.

Therefore, the arrangement of the present embodiment makes it possible to regulate the offset amount of the driving coupler 34 with respect to the driving shaft 25 in the disengaged condition and to keep the respective rotational axes at an approximately coincident position. Then, it is possible to prevent the offset of the driving coupler 34 from causing engagement failure of the couplers when the drawable portion 90 is inserted repeatedly.

Still further, because that urging mechanism is composed of the tapered face 342 and the regulating ring 37, which are separable with movement of the driving coupler 34, and the spring member 26, offset of the driving coupler 34 is permitted in a similar manner as the conventional case in the engaged condition. In other words, the driving coupler 34 is movable between a regulated position (FIG. 5B) where the offset amount is regulated by the abutment of the tapered face 342 and the regulating ring 37 and a movable position (FIG. 5A) where the displacement of the driving coupler is permitted within a range in which the large-diameter portion 343 is not in contact with the regulating ring 37. Then, the driving coupler 34 is moved to the regulated and movable positions by utilizing the movement of the driven coupler 83 involved in the drawing and inserting operations of the drawable portion 90. This arrangement makes it possible to avoid engagement failure of the couplers from occurring without hampering the original function of the Oldham mechanism of accommodating misalignment between the shafts.

By the way, it is conceivable to prevent engagement failure by correcting a positional deviation in a radial direction by providing a tapered face for guiding the opposite coupler in engaging with each other on one of the driving coupler 34 and the driven coupler 83. In this case, however, the tapered face needs to be formed largely by considering both of the offset amount of the driving coupler 34 in the disengaged condition and the positional deviation between the driving shaft 25 and the driven coupler 83, thus leading to enlargement of the drive transmission apparatus. Meanwhile, according to the present embodiment, the offset amount of the driving coupler 34 in the disengaged condition is reduced, which enables a compact design of the drive transmission apparatus without hampering reliability of the engagement operation.

It is noted that while the smallest diameter of the tapered face 342 has been described as being smaller than the outer diameter of the regulating ring 37 in the present embodiment, the tapered face 342 may be formed to be at least smaller than the inner diameter of the large-diameter portion 343. It is possible to prevent engagement failure of the couplers also in this case because the driving coupler 34 is urged toward the rotational axis of the driving shaft 25 by the urging mechanism 36 when the driving coupler 34 in the disengaged condition is going to deviate largely from the driving shaft.

Still further, the inclined face and the abutment portion are not limited to be the tapered face 342 and the regulating ring 37 described above, and may be replaced with ones that convert the urging force in the axial direction to a force in a radial direction and urge the driving coupler 34. For instance, the inclined face may be a plane shape other than the conical surface, e.g., an inclined face having a circular arc section, and the abutment portion may be a protrusion integrally formed on the driving shaft 25.

It is also possible to arrange such that one of the inclined face and the abutment portion may be disposed in the driving coupler 34 and another one in components other than the driving shaft 25 as long as a range of the offset amount of the driving coupler 34 is limited along with the disengagement from the driven coupler 83. For instance, it is possible to provide a regulating member having a tapered face abuttable with an outer circumferential portion of the driving coupler 34 downstream of the draw-out direction A2 rather than the position of the driving coupler 34 in the engaged condition. With this configuration, such movement of the driving coupler 34 along with the disengaging operation is realized that the offset amount of the driving coupler 34 is limited as compared to the engaged condition, which reduces engagement failure of the coupling.

Second Embodiment

Figure 6:
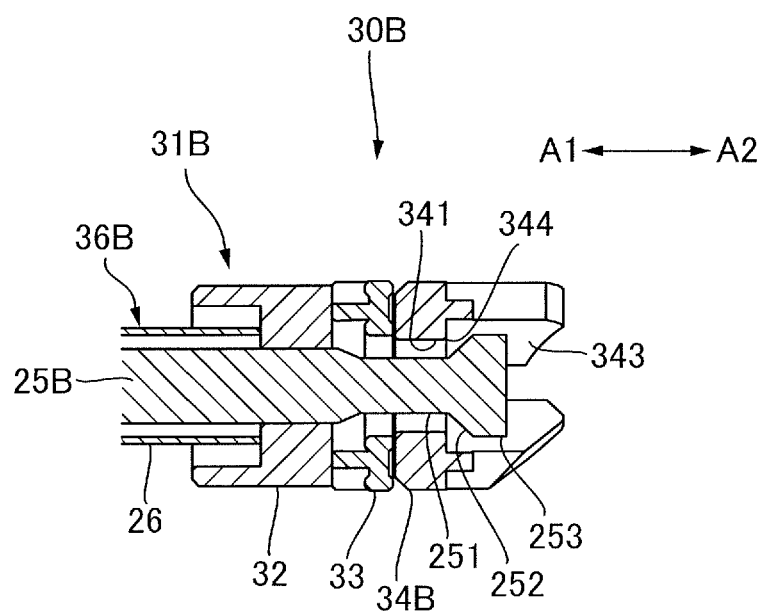
FIG. 6 is a section view of a drive transmission apparatus of a second embodiment.

Next, a drive transmission apparatus 30B of a second embodiment of the present disclosure will be described with reference to FIG. 6. It is noted that while FIG. 6 illustrates a section of the Oldham mechanism 31B in an engaged condition, the driven coupler 83 is omitted in the illustration. The drive transmission apparatus 30B is different from the first embodiment described above in a specific configuration of an urging mechanism, and other components are common in the both embodiments. Therefore, components common with those of the first embodiment will be denoted by same reference numerals and an explanation thereof will be omitted.

The urging mechanism 36B, another example of a moving portion, includes the spring member 26, a tapered face 252 formed on an outer circumferential surface of a driving shaft 25B, and an abutment portion 344 formed on an inner circumferential portion of a driving coupler 34B. The tapered face 252, which is an example of an inclined face, is disposed on the shaft member, i.e., the driving shaft 25B. The abutment portion 344 as a step portion is disposed on the engage member, i.e., the driving coupler 34B.

The inner circumferential surface of the driving coupler 34B includes a small-diameter portion 341 whose inner diameter is relatively small, a large-diameter portion 343 whose inner diameter is larger than that of the small-diameter portion 341, and the abutment portion 344 adjacent to the small and large-diameter portions 341 and 343 and connecting these stepwise. Meanwhile, the driving shaft 25B includes a small-diameter portion 251 and a large-diameter portion 253 respectively facing a small-diameter portion 341 and a large-diameter portion 343 of the driving coupler 34B. The small-diameter portion 251 is connected with the large-diameter portion 253 through the tapered face 252. The tapered face 252 is formed aslant with respect to the rotational axis of the driving shaft 25B and expands conically such that an outer diameter thereof increases toward the draw-out direction A2. A maximum diameter of the tapered face 252, i.e., an outer diameter of the large-diameter portion 253, is set to be larger than an inner diameter of the abutment portion 344.

With this arrangement, the abutment portion 344 abuts with the tapered face 252 by the urging force of the spring member 26 in the disengaged condition, and urging force is generated in a direction in which the rotational axis of the driving coupler 34B is brought closer to the rotational axis of the driving shaft 25B. Still further, in the engaged condition, because the driving coupler 34B is pressed into the insertion direction A1 by resisting against the urging force of the spring member 26 by the driven coupler 83, the abutment portion 344 separates from the tapered face 252 and faces the small-diameter portion 251.

Accordingly, it is possible to regulate the offset amount of the driving coupler 34 with respect to the driving shaft 25 in the disengaged condition also by the urging mechanism 36B of the present embodiment and to obtain similar advantages with that of the first embodiment. Still further, because the abutment portion of the present embodiment is formed integrally with the driving shaft 25B, it is advantageous in terms of costs as compared to the configuration in which the regulating ring or the like is separately disposed.

It is noted that while the inclined face 252 or 342 composing the urging mechanism has been described to be formed on one of the driving shaft or the driving coupler in the present embodiment and the first embodiment described above, the inclined face may be provided on both of the driving shaft and the driving coupler. It is possible also in this case to configure such that the driving coupler is urged toward the rotational axis of the driving shaft in the disengaged condition by abutting one inclined face with another inclined face (abutment portion).

Third Embodiment

Figure 7:
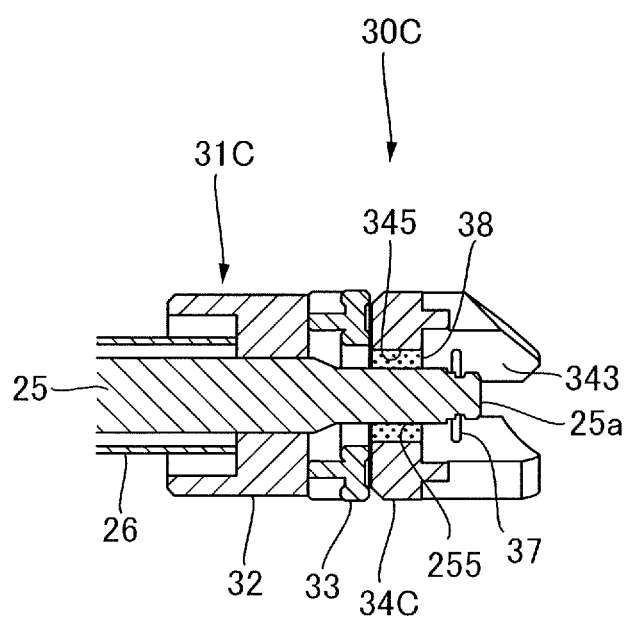
FIG. 7 is a section view of a drive transmission apparatus of a third embodiment.

Next, a drive transmission apparatus 30C of a third embodiment of the present disclosure will be described with reference to FIG. 7. It is noted that while FIG. 7 illustrates a section of the Oldham mechanism 31C in an engaged condition, the driven coupler 83 is omitted in the illustration. The drive transmission apparatus 30C includes an elastic member 38, which is another example of a moving portion, disposed between an inner circumferential surface 345 of the driving coupler 34C and an outer circumferential surface 255 of the driving shaft 25 as a moving portion. Components other than that and common with those of the first embodiment will be denoted by the same reference numerals and an explanation thereof will be omitted.

The elastic member 38 is a ring composed of elastomer having a solid or foaming structure for example, is adhered to the inner circumferential surface 345 of the driving coupler 34C and is movable together with the driving coupler 34C. An elastic force of the elastic member 38 is set to be a relatively small value so as not to hamper displacement of the driving coupler 34 in the engaged condition.

This arrangement makes it possible to urge the driving coupler 34C by urging force of the elastic member 38 in the disengaged condition and to hold the driving coupler 34C at a position where its rotational axis is approximately coincident with the rotational axis of the driving shaft 25. When the driven coupler 83 is offset from the driving shaft 25 in the engaged condition, the elastic member 38 permits offset amount of the driving coupler 34C to the driving shaft 25 by its elastic deformation.

Accordingly, the urging mechanism, i.e., the elastic member 38, of the present embodiment makes it possible to regulate the offset amount of the driving coupler 34C to the driving shaft 25 and to obtain similar advantages with that of the first embodiment. Still further, while the present embodiment can be combined with either one of the first and second embodiments, it is also applicable to a configuration in which the driving coupler does not move in the axial direction when the couplers are engaged and disengaged.

Fourth Embodiment

Figure 8:
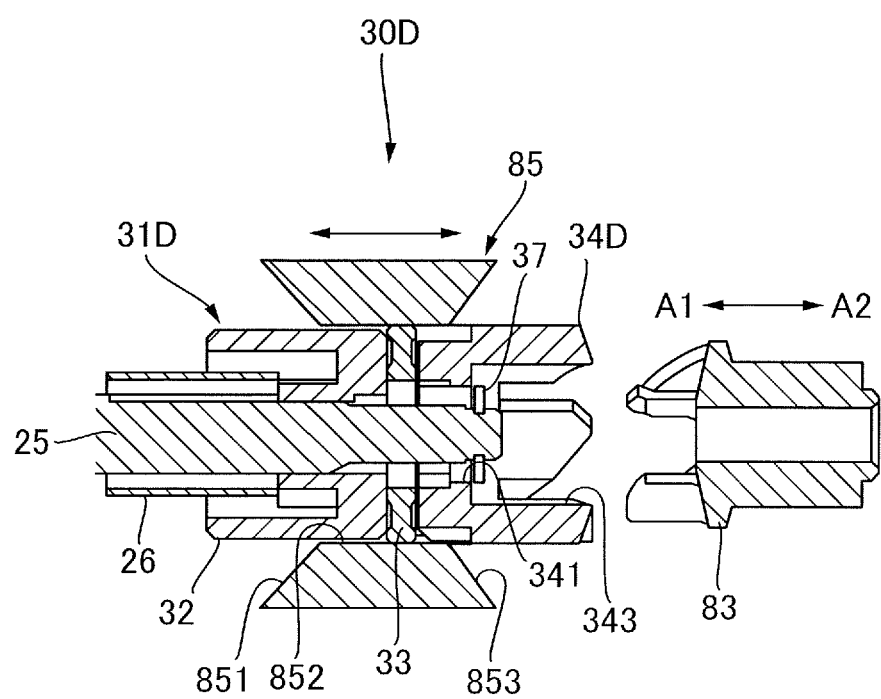
FIG. 8 is a section view of a drive transmission apparatus of a fourth embodiment.

Next, a drive transmission apparatus 30D of a fourth embodiment of the present disclosure will be described with reference to FIG. 8. FIG. 8 is a section view illustrating the drive transmission apparatus 30D in an intermediate condition between an engaged condition and a disengaged condition. The drive transmission apparatus 30D includes a cylindrical regulating member 85 disposed around an Oldham mechanism 31D as a moving portion capable of moving the driving coupler 34D toward a rotational axis of the driving shaft 25 so as to regulate offset amount of a driving coupler 34D. Components other than that and common with those of the first embodiment will be denoted by the same reference numerals and an explanation thereof will be omitted.

The cylindrical regulating member 85 is approximately cylindrical and having an inner circumferential surface 852 on radially inside with respect to an axis, i.e., a second axis, and an inner diameter thereof is slightly larger than an outer diameter of the driving coupler 34D. The cylindrical regulating member 85 is provided with tapered faces 851 and 853 formed to be aslant with respect to the rotational axis on both sides in the axial direction of the inner circumferential surface 852 such that the inner diameter of the cylindrical regulating member 85 expands axially toward both end portions. The tapered face 851 is an example of an inclined face abuttable with an outer circumferential part of the driving coupler 34D as an example of an engage member.

The cylindrical regulating member 85 is supported by the frame body of the drawable portion 90 and relatively moves along the axial direction with respect to the driving coupler 34D together with the driven coupler 83. Thereby, the cylindrical regulating member 85 is located upstream of the driving coupler 34D in the draw-out direction A2 in the engaged condition in which the driving coupler 34D is engaged with the driven coupler, 83 and is located downstream of the driving coupler 34D in the disengaged condition.

With such configuration as described above, when the drawable portion 90 having been drawn out of the apparatus body 100A is inserted again, the cylindrical regulating member 85 passes through an outside of the driving coupler 34D as illustrated in FIG. 8. In a case when the driving coupler 34D is offset from the driven coupler 83 at that time, the offset amount is reduced by the tapered face 851 of the cylindrical regulating member 85 abutting with the outer circumferential part of the driving coupler 34D. Then, the engagement claw 83a of the driven coupler 83 engages with the engagement claw 34b of the driving coupler 34D whose radial position has been corrected, so that the couplers are engaged.

Thus, radial position of the driving coupler 34D is regulated prior to the engagement of the coupler pair by providing the cylindrical regulating member 85 that is abuttable with the driving coupler 34D when the driving coupler 34D and the driven coupler 83 in the disengaged condition approach each other. Still further, because the cylindrical regulating member 85 is to be moved to a position not radially overlapping with the driving coupler 34D in the engaged condition, the cylindrical regulating member 85 permits the driving coupler 34D to be displaceable in the engaged condition. That is, it is possible to prevent engagement failure of the couplers without hampering the operation of the Oldham mechanism 31D in the engaged condition also by the configuration of the present embodiment.

Still further, because the cylindrical regulating member 85 is supported by the drawable portion 90, the cylindrical regulating member 85 can regulate the offset amount of the driving coupler 34D with respect to the rotational axis (the second axis) of the driven coupler 83. Due to that, it is possible to prevent engagement failure more reliably as compared to the first through third embodiments described above when an engagement operation is made in a condition in which the driven coupler 83 is offset from the driving shaft 25 relatively largely.

Still further, because the cylindrical regulating member 85 is provided with the tapered faces 851 and 853 on the both sides in the axial direction, the tapered face 853 on the opposite side abuts with the driving coupler 34D when the driving coupler 34D is displaced in drawing of the drawable portion 90 out of the apparatus body 100A. Thereby, the driving coupler 34D is moved toward the rotational axis of the driving shaft 25, and the cylindrical regulating member 85 is smoothly pulled out.

It is noted that while the cylindrical regulating member has been used as a moving portion in the present embodiment, a regulating member of any different shape may be used as long as it abuts with the outer circumferential part of the driving coupler 34D, i.e., the engage member, and regulates the offset amount of the driving coupler 34D. For instance, the regulating member may be a cylindrical member whose section is polygonal or a plurality of regulating members disposed evenly in a circumferential direction.

Still further, the regulating member is not limited to what follows the driven coupler 83 over a whole length of a moving range of the driven coupler 83 (the engaged member), i.e., a drawing width of the drawable portion 90, and may be configured so as to follow the driven coupler 83 only within a limited range. In this case, the regulating member may be configured to be located at a position (see FIG. 8) radially overlapping with the driving coupler 34D in the disengaged condition so as to regulate the offset amount of the driving coupler 34D during the disengaged condition.

Other Embodiments

While the description has been made such that the driving coupler, i.e., the engage member, is connected with the driving source, i.e., the driving motor M1, and the driven coupler, i.e., the engaged member, is connected with the conveyance unit, i.e., the duplex conveyance unit 80, in the abovementioned first through fourth embodiments, the driving side may be reversed with the driven side. That is, the drive transmission apparatus may be configured so as to transmit rotation from the engaged member to the engage member. Still further, the engage member and the engaged member may be what can move relatively along the axial direction. For instance, it is possible arrange such that the engaged member is disposed within the apparatus body and the engage member or the like is disposed in a movable unit movable with respect to the apparatus body.

Still further, if the intermediate member is radially displaceable with respect to the rotational axis (first axis), it is possible to arrange such that the intermediate member is engaged directly with the shaft member by providing an engage groove or an engage protrusion on the shaft member for example. Still further, not only the configuration in which the rotary member, i.e., the fixed member 32, rotates in a body with the shaft member, it is possible to configure such that the rotary member can rotate relatively with the shaft member on the first axis by adopting a double shaft structure for example.

Still further, although the driving coupler has been described as composing the part of the so-called Oldham coupling, which accommodates parallel misalignment primarily, the driving coupler may include an element of a flexible joint that permits an angular difference, i.e., angular misalignment, between shafts by deflecting a part of the driving coupler for example if the driving coupler is configured such that the engage member can be displaced with respect to the shaft member through the intermediate member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-076286, filed on Apr. 6, 2016, which is hereby incorporated by reference wherein in its entirety.

What is claimed is:

1. A drive transmission apparatus comprising:
   a shaft member disposed on a first axis;
   an engage member supported by the shaft member and configured to rotate;
   an engaged member (i) configured to rotate centering on a second axis in parallel with the first axis and (ii) configured to be engaged with and disengaged from the engage member by relatively moving, with respect to the engage member, along an axial direction of the first axis;
   an intermediate member interposed between the shaft member and the engage member and configured to permit the engage member to rotate centering on the second axis in an engaged condition in which the engage member is engaged with the engaged member; and
   a moving portion configured to move the engage member in a movement direction such that a rotational axis of the engage member approaches the first axis in terms of a radial direction with respect to the first axis in a disengaged condition in which the engage member is disengaged from the engaged member, the movement direction being a direction different from the axial direction of the first axis.

2. The drive transmission apparatus according to claim 1, wherein
   the moving portion comprises
      an urging member configured to urge the engage member along the axial direction, an inclined face formed on one of the shaft member and the engage member and inclined with respect to the first axis, and an abutment portion provided in another one of the shaft member and the engage member and configured to abut with the inclined face, and wherein the inclined face and the abutment portion abut with each other by the engage member being urged by the urging member in the disengaged condition, so that the engage member is moved in the movement direction.

3. The drive transmission apparatus according to claim 2, wherein the inclined face is a part of an inner circumferential surface of the engage member and is formed such that an inner diameter increases toward an urging direction of the urging member, and wherein the abutment portion projects radially outward from an outer circumferential surface of the shaft member and has an outer diameter larger than a smallest diameter of the inclined face.

4. The drive transmission apparatus according to claim 3, wherein the engage member comprises a large-diameter portion which is adjacent downstream of the inclined face in the urging direction of the urging member and which has an inner diameter larger than the outer diameter of the abutment portion, and wherein in a case in which the engage member and the engaged member engage with each other, the engage member is pressed by the engaged member while resisting against urging force of the urging member to a position where the abutment portion faces the large-diameter portion and separates from the inclined face.

5. The drive transmission apparatus according to claim 3, wherein the inclined face is a conical tapered face whose inner diameter increases toward the urging direction of the urging member, and wherein the abutment portion is a ring member provided around the outer circumferential surface of the shaft member.

6. The drive transmission apparatus according to claim 2, wherein the inclined face is a part of an outer circumferential surface of the shaft member and formed such that an outer diameter increases toward an urging direction of the urging member, and wherein the abutment portion is formed on an inner circumferential surface of the engage member and has an inner diameter smaller than a maximum diameter of the inclined face.

7. The drive transmission apparatus according to claim 6, wherein the shaft member comprises a small-diameter portion which is adjacent upstream of the inclined face in the urging direction of the urging member and which has an outer diameter smaller than the inner diameter of the abutment portion, and wherein in a case in which the engage member and the engaged member engage with each other, the engage member is pressed by the engaged member while resisting against urging force of the urging member to a position where the abutment portion faces the small-diameter portion and separates from the inclined face.

8. The drive transmission apparatus according to claim 6, wherein the inclined face is a conical tapered face whose outer diameter increases toward the urging direction of the urging member, and wherein the abutment portion is a step portion formed on the inner circumferential surface of the engage member such that an inner diameter of the abutment portion changes stepwise.

9. The drive transmission apparatus according to claim 2, further comprising a rotary member supported by the shaft member movably along the axial direction and configured to rotate centering on the first axis; and wherein the intermediate member is disposed between the rotary member and the engage member in the axial direction, and wherein the urging member is a spring member externally fitted around the shaft member and urging the engage member through the rotary member and the intermediate member.

10. The drive transmission apparatus according to claim 1, wherein the moving portion comprises an elastic member disposed between an outer circumferential surface of the shaft member and an inner circumferential surface of the engage member in a radial direction with respect to the first axis.

11. The drive transmission apparatus according to claim 1, wherein the moving portion comprises an urging member configured to urge the engage member along the axial direction, and wherein the engage member is movable along the axial direction between a movable position at which the engage member is radially displaceable with respect to the first axis and a regulated position at which the engage member is regulated from being displaced from the first axis, and configured to be held at the movable position by the engaged member in the engaged condition and to be held at the regulated position by being urged by the urging member in the disengaged condition.

12. The drive transmission apparatus according to claim 1, wherein the engage member comprises a first engagement claw comprising a first abutment surface extending along the axial direction, wherein the engaged member comprises a second engagement claw comprising a second abutment surface extending along the axial direction and configured to abut with the first abutment surface, and wherein at least one of the first and second engagement claws is provided with a guide surface inclined with respect to the axial direction and configured to abut against another one of the first and second engagement claws in a case in which the engage member and the engaged member in the disengaged condition approach each other along the axial direction, so that the engage member and the engaged member are relatively rotated to positions where the first and second abutment surfaces come into contact with each other.

13. The drive transmission apparatus according to claim 1, further comprising a fixed member supported by the shaft member and configured to rotate in a body with the shaft member; and wherein the intermediate member comprises
    a body portion being rotatable,
    a first convex portion projecting from the body portion in a first direction along the axial direction and extending in a radial direction with respect to a rotational axis of the body portion, and
    a second convex portion projecting from the body portion in a second direction opposite to the first direction and extending in a radial direction intersecting with the first convex portion when viewed from the axial direction, and wherein the fixed member comprises a first groove slidably engaged with the first convex portion, and the engage member comprises a second groove slidably engaged with the second convex portion.

14. An image forming apparatus, comprising:
an apparatus body;
a conveyance unit provided in the apparatus body drawably out of the apparatus body and configured to convey a sheet;
an image forming portion provided in the apparatus body and configured to form an image on the sheet conveyed by the conveyance unit;
a driving source provided in the apparatus body; and
the drive transmission apparatus according to claim 1 and configured to transmit driving force from the driving source to the conveyance unit.

15. The image forming apparatus according to claim 14, wherein the shaft member is a driving shaft disposed in the apparatus body and driven by the driving source, and
wherein the engaged member is disposed in the conveyance unit.

16. The image forming apparatus according to claim 15, further comprising a conveyance roller supported on the shaft member and configured to convey the sheet to the conveyance unit.

17. The drive transmission apparatus according to claim 1, wherein the moving portion is configured to move the engage member in the movement direction by applying a force in a radial direction with respect to the first axis to the engage member.

18. A drive transmission apparatus comprising:
a shaft member disposed on a first axis;
an engage member supported by the shaft member and configured to rotate;
an engaged member configured to rotate centering on a second axis in parallel with the first axis and to be engaged with and disengaged from the engage member by relatively moving with respect to the engage member along an axial direction of the first axis;
an intermediate member interposed between the shaft member and the engage member and configured to permit the engage member to rotate centering on the second axis in an engaged condition in which the engage member is engaged with the engaged member; and
a moving portion configured to abut against and move the engage member in a movement direction such that a rotational axis of the engage member approaches the second axis in terms of a radial direction with respect to the second axis in a case in which the engage member and the engaged member approach each other in a disengaged condition in which the engage member is disengaged from the engaged member, the movement direction being a direction different from the axial direction of the first axis.

19. The drive transmission apparatus according to claim 18, wherein the moving portion comprises an inner circumferential surface formed radially inside with respect to the second axis and comprising an inclined face inclined with respect to the axial direction, the inclined face being configured to abut against and move the engage member in the movement direction in a case in which the engage member and the engaged member in the disengaged condition approach each other.

20. The drive transmission apparatus according to claim 18, wherein the moving portion is configured to move the engage member in the movement direction by applying a force in a radial direction with respect to the second axis to the engage member.

* * * * *